Dec. 12, 1950 W. C. HASSELHORN 2,534,123
METHOD OF MAKING METAL BELLOWS
Filed May 4, 1944 5 Sheets-Sheet 2
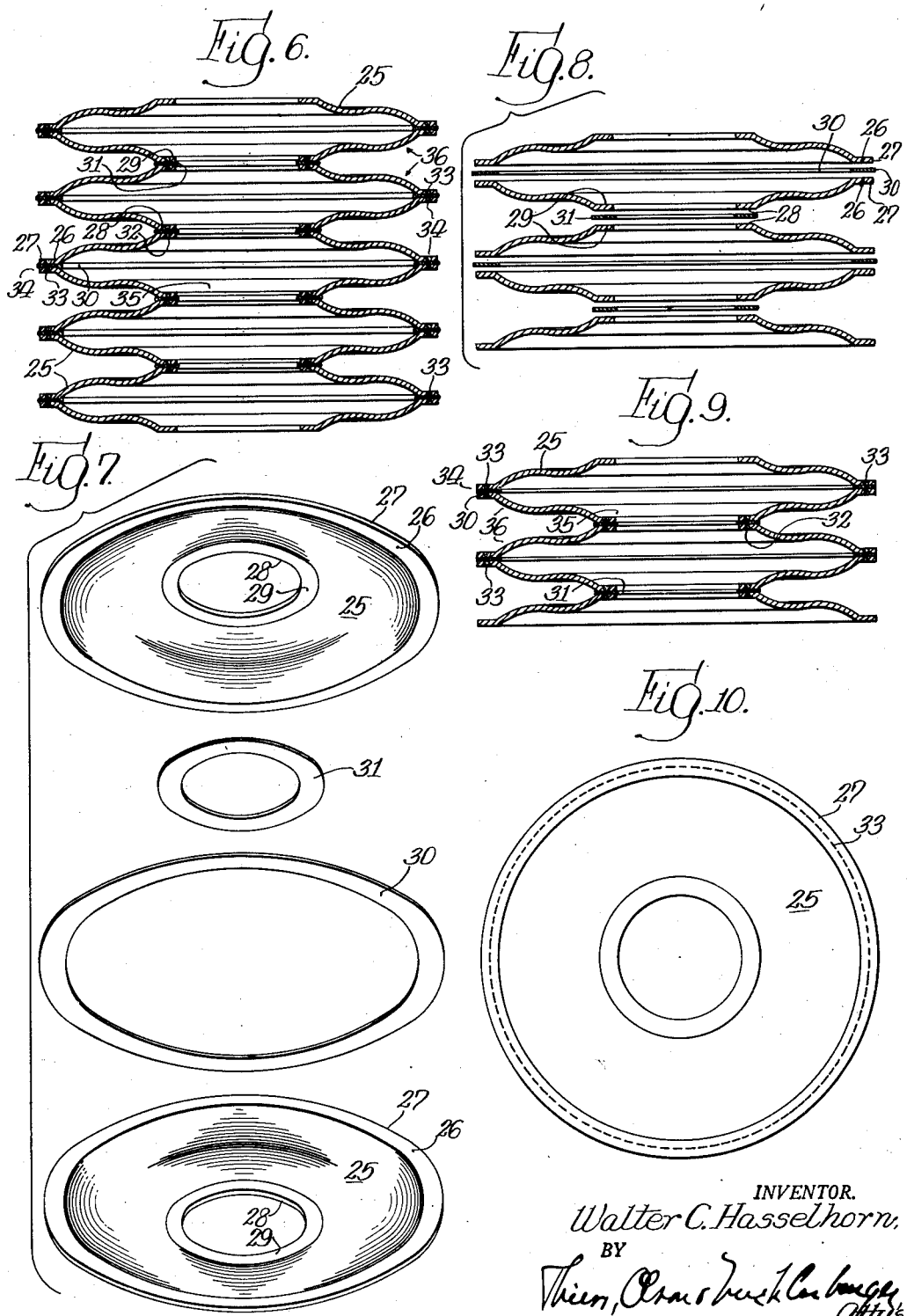
INVENTOR.
Walter C. Hasselhorn,
BY

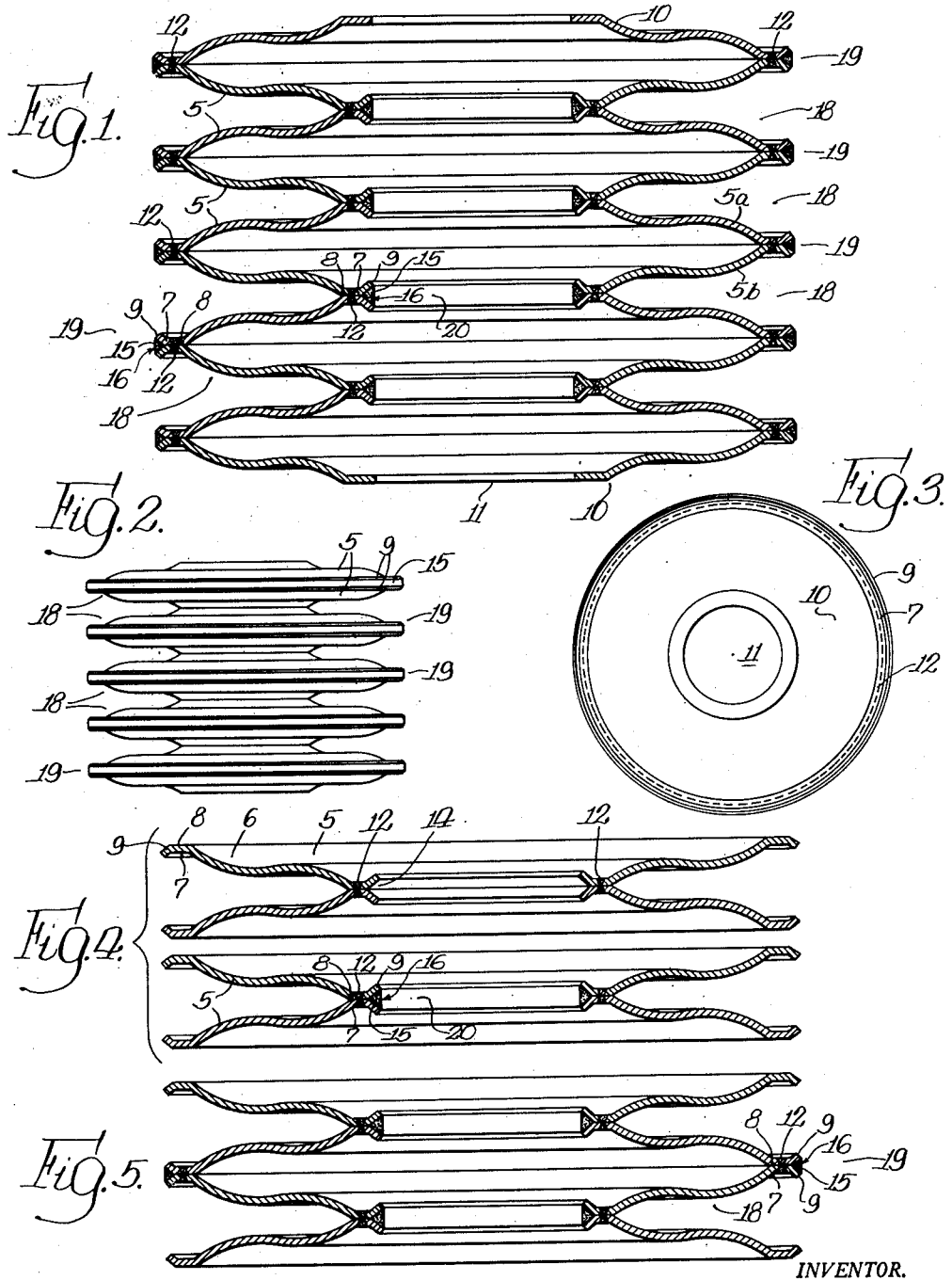

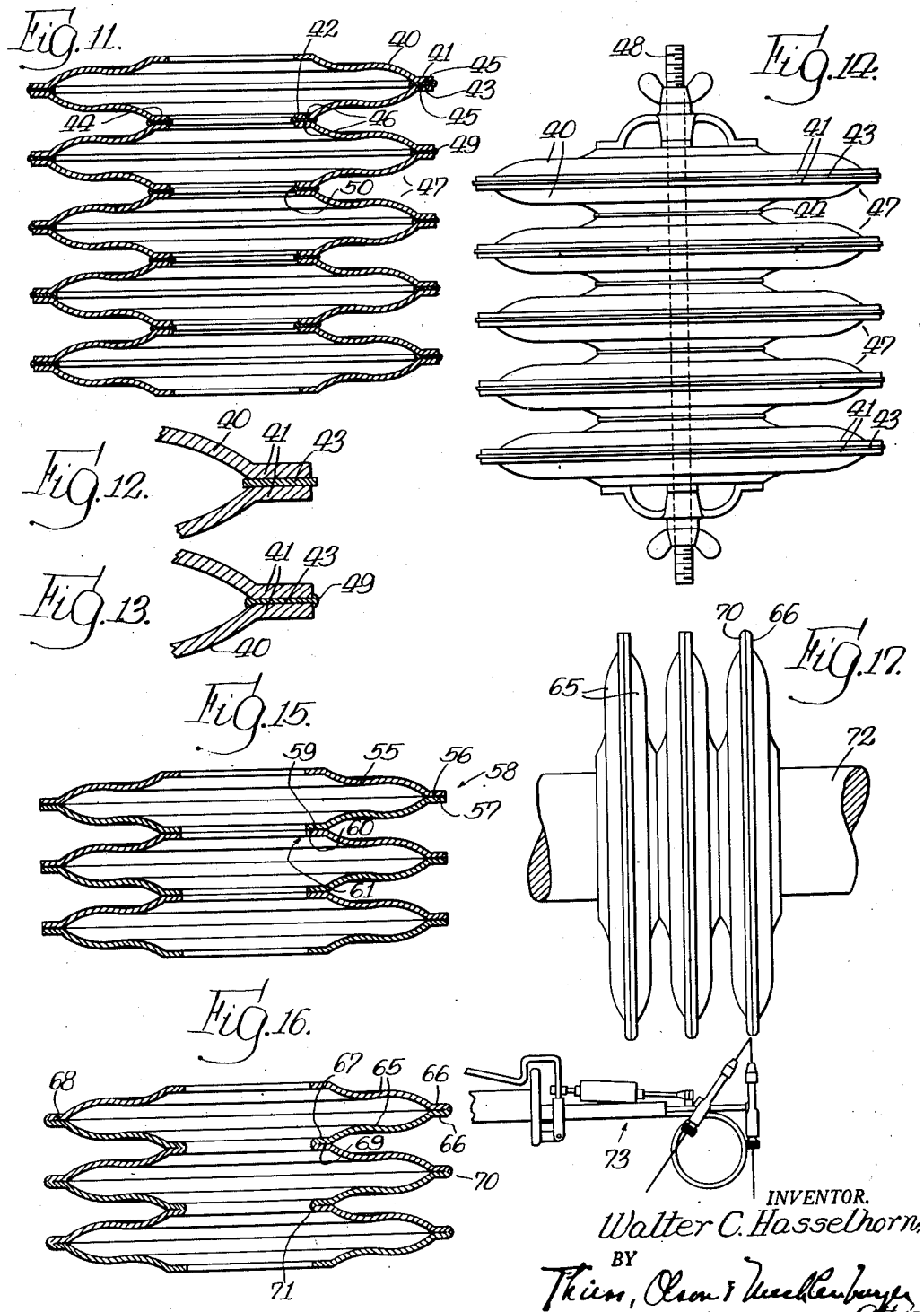

Dec. 12, 1950 W. C. HASSELHORN 2,534,123
METHOD OF MAKING METAL BELLOWS
Filed May 4, 1944 5 Sheets-Sheet 4

INVENTOR.
Walter C. Hasselhorn,
BY
Theiss, Olm & Mucklebury
Attys

Dec. 12, 1950     W. C. HASSELHORN     2,534,123
METHOD OF MAKING METAL BELLOWS
Filed May 4, 1944     5 Sheets-Sheet 5
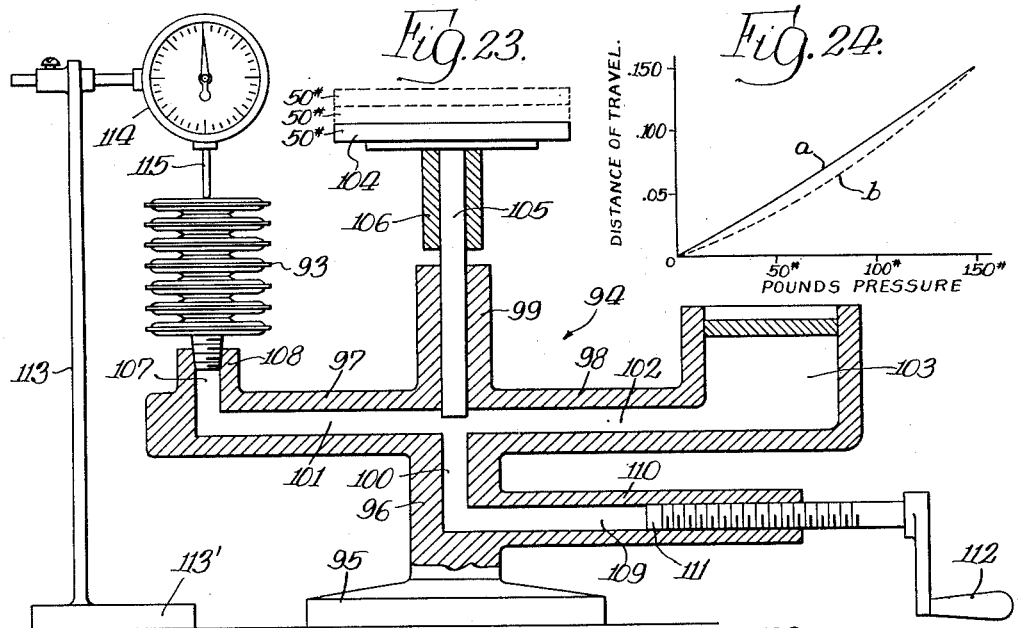
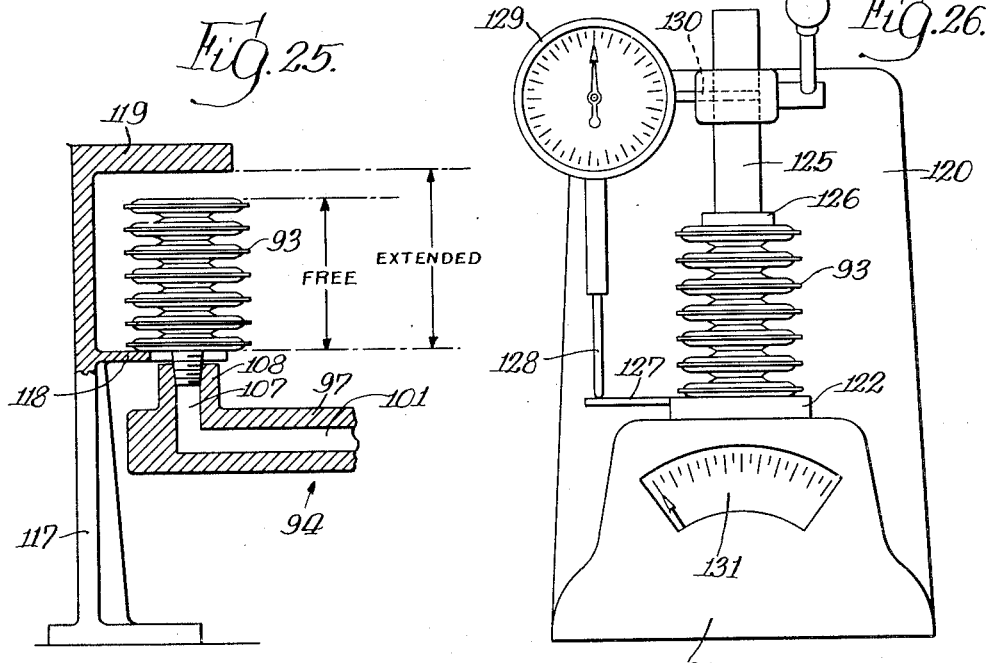
INVENTOR.
Walter C. Hasselhorn
BY Patented Dec. 12, 1950

2,534,123

UNITED STATES PATENT OFFICE 2,534,123

METHOD OF MAKING METAL BELLOWS

Walter C. Hasselhorn, Chicago, Ill., assignor to Cook Electric Company, Chicago, Ill., a corporation of Illinois Application May 4, 1944, Serial No. 534,056

3 Claims. (Cl. 148—21.55)

This invention relates to a new and improved metal bellows and to a method of making the same.

Bellows may be divided mainly into two different types, i. e., the corrugated wall type formed from a tubular blank and the sectional plate assembly having individual plates mechanically interlocked at their peripheries. Both types are now applied to a great variety of uses which require that they possess the characteristics of elasticity of form and uniformity of action, and also of great durability of performance, under repeated stress. In many uses to which they are put, a relatively large elastic range of movement is required to insure that the wall shall return to its original form and length, without taking a permanent set, after the deforming force has been removed.

The corrugated wall bellows made from a tubular blank is fabricated into shape by subjecting the tube to various cold working operations, by means of which this tube is converted into the required corrugated form. Each time the blank is subjected to a drawing operation, which reduces the diameter of the same, and it is customary to subject the blank by small increments and thereby avoid imposing undue strain upon the metal in its walls, a portion of the end of the blank is worked over into the tubular wall. As the entire tubular wall is subjected to cold working during each drawing operation, it follows that the tubular wall is composed of a plurality of zones, each of which is subjected to one less cold working operation, from the top to the bottom. It follows, therefore, that if the blank is subjected to an annealing operation after each drawing operation so as to remove brittleness, which is produced by the drawing operation, and the annealing operations are not effective to eliminate all the effects of cold working operations, a wall will be produced having a plurality of zones of different physical characteristics. The flexibility and durability of the metal must differ, in the different zones, progressively from the bottom up, and consequently, the metal wall lacking uniformity in its physical characteristics is no stronger than its weakest zone. This method of working the metal to convert it into the required corrugated form from a tubular blank and the necessity of using a tubular blank in order to carry out this method of procedure, also inherently limits the diameter and length of the bellows which may be produced.

The same limits are not inherent in the sectional plate type of bellows and I have found that the limited cold working operations required to form the plates in this type of bellows will not detrimentally affect the physical characteristics of the metal, but, quite to the contrary, impart life or durability by hardening the metal to increase its elasticity and insure that it will return to its original form or length, without taking a permanent set, after the deforming force has been removed. Annealing operations are not necessary after the drawing operations so that the problem in the corrugated wall type of overcoming the presence of zones of different physical characteristics to obtain uniform flexibility and durability throughout the wall is absent in the plate type. Notwithstanding the superiority of the plate type of bellows, the methods employed heretofore to make the same resulted in a product generally devoid of uniform spring rate throughout the plate sections.

Moreover, the joints formed about the peripheries of the sectional plates restricted the use to which the bellows could be put and affected the working characteristics. The soldered joint limited the temperature range of the bellows in use, while crimped or welded joints tended to change the grain structure of the wall at and immediately adjacent the joints. While the soldered joint of the type shown in United States Patent No. 1,726,584 did not impair the flexibility of the bellows plates when constructed as shown in this patent, no control for obtaining a uniform spring rate was present.

It was found that units of the same production lot might have different spring rates and respond differently. The brazed or welded joint tended to produce less uniform results, and hence, much difficulty was experienced to assure a sensitive response that would not vary in units designed to have the same capacity or in units of the same production lot.

To overcome these objections, and to secure the benefits of my invention, I propose to employ a method of making metallic bellows that will produce a predetermined or calibrated spring rate in the metal wall, which method is susceptible of such control that bellows may be made sensitively to respond uniformly to predetermined variations of pressure and return to the same no-load position unimpaired almost indefinitely. Moreover, the method admits of a difinite control of the spring rate whereby units of the same production lot will respond uniformly, this control providing any desirable spring rate for a wide range of optional requirements in the use of bellows.

A further object of the invention is to produce by this method a new and improved form of metal bellows having predetermined characteristics whereby the bellows will be sensitive to extremely small pressure fluctuations and respond to exceedingly low pressures without loss in stroke over a period of time, and of using, on the other hand, relatively heavy gauge metals for heavy duty work where resiliency is desirable and the metal must be protected from taking a permanent set by having a spring rate admitting of predetermined travel without fracture.

A still further object is to provide an improved form of metal bellows having the aforesaid resilient walls of calibrated uniform spring temper, which walls may be first formed of sectional plates and then joined at their peripheries by a construction that will not be impaired by a subsequent thermal treatment of tempering to produce a predetermined spring rate. Consequently, irrespective of any change of grain structure at the areas joined caused by the working of the metal or the temperature to which the metal is subjected during the time the joints are formed, the subsequent treatments of tempering, or even pre-treatments of normalizing if necessary, will result in restoring the grain structure, or a grain structure of similar characteristics whereby substantially the same spring rate will prevail throughout the metal. Not only will this spring rate be uniform throughout all portions of the same unit, but also uniform in the same production lot and capable of reproduction in subsequent production lots.

The invention in its broadest aspects is directed therefore to a metal bellows that can be uniformly produced at all times with a controlled-uniform spring rate, and be made to respond to exceedingly low pressure fluctuations and return almost indefinitely to the same no-load position without change of stroke. In practice, I have found that with a pressure load as low as .001 pound, a bellows embodying the present invention could be made to respond faithfully after a set not exceeding .001 inch upon the first operation.

A further object is to provide an improved joint of various types securing the peripheries of the wall sections of a metal bellows. Several different types of the improved joint are disclosed herein. Each has for its purpose the provision of a strong and durable union of the wall sections at their peripheries, and, if so desired, a hermetical seal.

A further object is to provide an improved type joint adapted to form, in effect, a continuous wall at the peripheries of the sections, which wall will have substantially the same physical characteristics as the metal forming the sections, whereby, if the unit is thereafter thermally treated to be provided with a predetermined spring rate, the wall at the union will obviously have the same spring rate, and a continuous somewhat homogenous metal structure will be formed from end to end of the bellows. Thus, a bellows structure of a continuous wall having any depth of flange may be provided of spring metal that may be treated to have a given spring rate uniformly distributed throughout, and no limit as to diameter, length of bellows, or depth of flange is imposed.

A further object is to include in the method steps for determining whether a predetermined spring rate has been imparted to the bellows wall. Various factors including the human element enters into the work of fabrication as well as the characteristics of the material at the time it is furnished by the mill. Much may depend upon the accurate calibration of the spring rate and the continued performance of the unit in the field. The invention also includes, therefore, determining the accuracy followed in the fabrication of the unit so that precision work must be performed in the making of the unit or else the unit will be discarded.

Other objects and advantages of the invention will be apparent from the following detailed description when taken in connection with the accompanying drawings.

In the drawings:

Figure 1 is a vertical section of a metal bellows embodying the invention disclosed herein and showing one type of improved joint between section plates or diaphragms involving stitch and arc welding;

Fig. 2 is a side elevation of the same;

Fig. 3 is a plan view of the bellows shown in Fig. 1;

Fig. 4 illustrates a number of section plates to show how they are first joined at their inner peripheries before being joined at their outer peripheries;

Fig. 5 illustrates how these section plates may thereafter be joined at their outer peripheries;

Fig. 6 is a vertical section of another form of metal bellows embodying the invention, the type of joint shown involving brazing and stitch welding instead of stitch and arc welding as shown in Figs. 1 to 5;

Fig. 7 is an exploded view of the sectional plates and brazing rings forming a single flange of the bellows shown in Fig. 6;

Fig. 8 illustrates in vertical section the manner of assembling the sectional plates and brazing rings of several of the bellows flanges to effect the brazing operation;

Fig. 9 illustrates these parts after brazing;

Fig. 10 is a top plan view of the bellows shown in Fig. 6;

Fig. 11 is a vertical section of a metal bellows embodying the present invention but illustrating brazed joints that omit the welding illustrated in the previous types;

Fig. 12 is a fragmentary enlarged sectional view of the joint illustrated in Fig. 11 before the thermal treatment effecting the brazing operation;

Fig. 13 is a similar view illustrating the joint after the brazing operation is completed;

Fig. 14 illustrates one form of fixture that may be used to keep the sectional plates and brazing rings under pressure during the thermal treatment in order that the brazing material will be compressed and caused to spread during the brazing operation thereby being of less thickness than the initial brazing ring;

Fig. 15 is a further form of metal bellows embodying the invention, but illustrating brazed joints formed through the use of brazing material introduced as the result of first plating the sectional parts;

Fig. 16 is a still further form of metal bellows embodying the invention, but illustrating the peripheries joined by an atomic hydrogen weld to cause the metal at these peripheries to form a homogenous union;

Fig. 17 illustrates the metal bellows shown in Fig. 16 upon a mandrel and the manner in which the atomic hydrogen arc is applied to the outer peripheries;

Fig. 23 illustrates a dead weight testing machine to determine the ability of a bellows unit embodying the invention to return to the same non-load position without hysteresis;

Fig. 24 shows a diagram chart illustrating in dotted line the return movement of the bellows when hysteresis occurs;

Fig. 25 illustrates apparatus used to determine any squirm or leak occurring in a finished bellows unit; and Fig. 26 illustrates apparatus known as a spring rate tester that determines the calibrated spring rate imparted to the metal by employing the aforesaid fabricating steps, the readings being in pounds required to compress a bellows one inch.

Figure 18:
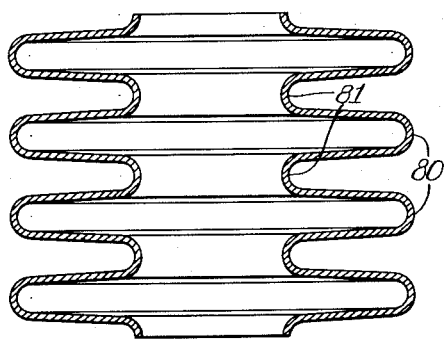
Fig. 18 is a vertical section of a metal bellows embodying the invention, but employing a butt welded type of joint to secure the advantage of a continuous wall of the same thickness from one end of the bellows to the other, whereby the added thickness caused by the lap or crimp type of joint is eliminated.

In the built-up bellows unit, the fabrication of the joint has always been considered a limiting factor because it was never deemed desirable to perform further work upon the assembled unit after the joints were completed less a destructive effect might result. Flexibility was heretofore sought by varying the width of the flange, the thickness of the material and by changing the formation of the flange surfaces through the use of radial or circumferential corrugations. For this reason the field of use of bellows has been restricted very materially. The method and the product disclosed herein are designed to produce a predetermined control of the flexibility within definite limits to obtain what might be called a controlled spring rate so that a spring rate of a predetermined value will be imparted to the metal. This spring rate will be substantially uniform throughout the unit and the exact stroke for a given pressure variation will be known and maintained. With this improved structure, the field of use for bellows has been greatly extended. Not only new control devices have been made possible but remarkable advancements have been made in many fields of control as a direct result of having this improved bellows structure available. Also, the bellows need not be restricted to applications of low temperatures and pressures as heretofore, but may be used in installations subjecting them to temperatures as high as 1500° F. and to pressures as high as 10,000 pounds per square inch.

The various structures disclosed herein novelly permit the use of spring metal that may be obtained in an annealed or soft state or semi-soft state, and then, as shown in Figs. 1 to 5, inclusive, spun or drawn to the desired section or diaphragm curvature. These sections or diaphragms designated as 5 may be given any advantageous form for the type of bellows to be produced and made of plate stock of a thickness necessary for the requirements of the job. As illustrated, each diaphragm or plate 5 has its outer peripheral portion 6 provided with a flat part 7, furnished with a flat or planar face 8 and an angularly out-turned rim 9. Plates 5 may also have inner peripheries joined by the same construction. If plates 5 form end plates as at 10, openings 11 are provided without this construction.

While Fig. 1 illustrates a complete assembly in section and Fig. 2 illustrates the bellows in elevation, I have shown in Figs. 4 and 5 the sequence in which plates 5 are joined. They are positioned oppositely in pairs so that the inner peripheral faces 8 thereof abut each other whereupon these faces are stitched together by welding as at 12. The inner rims 9 of the upper and lower plates of each pair then form a V-groove 14 that opens inwardly. Into this V-groove 14 may be flowed welding material 15 by any suitable welding operation, say by arc welding and with the welding rod positioned to keep the material in this groove 14 as it is fused. After this welding operation is finished and material 15 has been properly deposited in groove 14, the face 16 of material 15 may be ground smooth. This grinding step reveals any blow holes or pits that might form during the welding operation. If such blow holes or pits are found, the pair of diaphragms 5 are discarded, because the hermetical seal, which material 15 furnishes at the joint, will undoubtedly be impaired. Even though the holes or pits do not extend the entire thickness of the deposit, their presence may cause a break during the use of the finished bellows. Thus, the V-groove 14 using the weld deposit 15 therein affords an opportunity to inspect the character of the weld after it is made through this grinding step of face 16. When pairs of plates 5 are joined in this manner at their inner peripheries and they have been determined to be acceptable upon inspection after grinding face 16 of the welding material 15, they are joined at their outer peripheries substantially in the same manner, as shown in Fig. 5. In this way, a bellows unit is built up to have the number of flanges desired in order to produce the required stroke for the work it is to perform.

A bellows flange may be defined as two sectional plates 5 secured together at their outer peripheries to form an outer peripheral joint 19, both plates being secured at their inner peripheries to the plates of adjacent flanges to form inner peripheral joints 20. In other words, for illustrative purposes, plates designated 5a and 5b in Fig. 1 comprise a single bellows flange which is designated 18 for reference purposes. The bellows shown in Figs. 1 and 2 comprise five flanges, but this number may be varied according to the work intended to be done and the stroke that may be required.

As stated, the outer peripheral joints 19 may be constructed in the same way as the inner peripheral joints 20. Accordingly, the faces 8 of the plates of each flange 18 at the outer peripheries are placed together in abutting relation and are also welded as at 12. Welding material 15 is likewise flowed into V-groove 14 formed by the angularly out-turned rims 9. Faces 16 are also ground, if so desired, to expose any blow holes or pits, so that the joints formed and their connecting plates may be discarded if necessary. Welds 12 for both outer and inner peripheral joints 19 and 20 may be merely stitches or they may be a seam, continuous or at intervals, to provide the mechanical strength holding adjacent plates together at these joints. The weld fill 15 in the V-grooves 14 is disposed adjacent the welds 12 and acts to provide a hermetical seal for both the outer and inner joints 19 and 20, this fill being advantageously disposed, as will be noted, with respect to the welds 12 providing the mechanical strength at the joints, so that little strain, if any, is placed upon the same. In this way, the hermetical seal is adequately protected from destruction and may be effectively used to maintain pressure within the bellows over a long period of time. Inasmuch as the stock used for plates 5 may be sheet metal with smooth surfaces, the drawing or spinning operation forming the plates will not normally disturb the smooth surface with the result that planar faces 8 will be smooth and will lie in tight surface contact when abutting each other. If the stock is not smoothed surface, which might be the case if substantially heavy stock is used, it is apparent that a simple machining operation will produce planar faces 8.

In effecting the welds 12 and 15, diaphragms 5 in contact therewith are momentarily heated to the proximity of their melting point with a consequent temperature gradient from this zone to a distant point therein at which the temperature rise is insignificant. If this thermal gradient is found to be a source of distortion or of internal stresses, or both, the entire bellows or such portions thereof as may be necessary, can be subjected to a stress-relief annealing operation in order to produce a strain-free or substantially strain-free structure. Temperatures in the neighborhood of 4000° F. may be used to produce welds 12 and 15, and consequently, the subsequent normalizing operation may be carried out in a temperature range of 1400° F. to 1600° F., or thereabouts. If the entire bellows is given a stress-relief anneal, the bellows may be inserted in a furnace or salt bath for several hours, it being desirable to control the operation by thereafter quenching in oil having a temperature of about 70° F. If only the portion subjected to the temperature gradient is required to be relieved of stress, a torch may be used instead of a furnace or salt bath. Whatever may be the condition of the base metal after the welding at 12 and 15, any method of stress-relief annealing can be employed if it is found desirable to employ a stress-relief anneal. In certain instances, it is preferable to have the metal of the bellows sections, even at the welds and the abutting flat portions 7 at the joints, completely strain-free for the subsequent step of drawing the same to a desired spring temper. In other instances, complete stress-relief may not be necessary to impart the desired spring rate, or it may not be necessary to subject the base metal or bellows or any portion thereof to this stress-relief treatment, in which event the step may be omitted without departing from the broad aspect of the invention.

If the metal is non-austenitic in character, the entire bellows unit may be subjected to a temperature at or near the high critical limit of the metal and then quenched in order to impart a uniform stressing, which will be eased when subsequently thermally treated to impart a predetermined spring rate.

The next step is subjecting the entire bellows unit to a spring tempering treatment in order to impart a predetermined spring rate therein. This treatment is designed to impart a predetermined and uniform spring temper to all portions of the unit including the peripheral joints. Although working of the metal in the drawing or spinning of the stock to form the diaphragms and the fabrication of the joints at the peripheries may cause changes in the physical characteristics of the metal, this treatment will cause all units to be of uniform spring rate and consistently uniform as to any given production lot or reproduction thereof. The treatment comprises subjecting the units to a temperature of 400° F. to 1100° F., or any other temperature that will produce this desired spring rate for a bellows unit of given construction for use under given conditions in order to effect a predetermined work result, it being understood that this temperature will not be of a magnitude, however, that will impair the steps previously employed in the method to fabricate a complete or substantially complete unit. The temperature treatment may be conducted by the use of a furnace, or of any other suitable equipment, which will subject the unit to temperature of the degree selected and for the required time, which time may be for one hour or so, depending upon the degree of hardness desired. After this thermal treatment is completed, the bellows units are removed from the heating zone and allowed to cool slowly until room temperature or such other lower temperature is reached as will produce the desired increased tensile strength of the metal. If the metal if of a kind requiring immediate quenching at the upper critical limit to prevent change in grain structure, the metal should thereafter be again drawn at or below the lower critical limit from two to three hours to impart the desired spring rate. The spring rate of a bellows may be defined as the number of pounds required to compress the bellows one inch and to have the bellows return to its original non-load position when relieved of the force without loss of stroke. This spring rate will increase with the hardness produced by the thermal treatment.

However, the hardness may be defined, whether by Brinell, Rockwell or by Tinius Olsen treatment, it is known that with each increase of ten degrees of temperature during the temper drawing operation, the hardness is lowered one to two points. I have found that for certain metals, such as for example heat treatable high carbon or alloy steels, treating the fabricated bellows to a temperature of 575° F., a tensile strength of two hundred thousand pounds may be produced. At a treating temperature of 700° F., the tensile strength will be reduced to one hundred eighty thousand pounds, while at 1075° F., the tensile strength will be in the neighborhood of one hundred twenty-five thousand pounds. These figures are illustrative examples only, because the kind of metal and its grain structure at the time of thermally treating it to produce spring temper must be taken into consideration.

The method may be practiced to produce extremely sensitive spring bellows capable of faithfully responding indefinitely to a very slight pressure change to actuate a control device and to retain such sensitiveness over a range of continued pressure change of slight magnitude without failure or loss of stroke. After an initial loss of say one ten thousands inch due to hysteresis of the metal, it has been found that a bellows embodying the present invention may function indefinitely to produce a minute but predetermined stroke to actuate an operating control device. On the other hand, heavy duty bellows of metal of relative heavy gauge may also be produced with a like uniform spring rate.

Figs. 6 to 10, inclusive, illustrate another type of joint that may be used in the method of producing the bellows unit embodying the invention.

The metal stock is either spun or drawn to form sectional plates 25 of any suitable formation, and, if so desired, with inner peripheries as well as outer peripheries. Both peripheries may have relatively flat inner faces 26 on the outer rims 27 and relatively flat inner faces 28 on the inner rims 29. These faces 26 and 28 may be formed flat as by grinding or any other suitable way. Brazing rings 30 and 31 are adapted to be placed between these outer and inner rims 27 and 29, with the inner faces 26 and 28 being pressed thereagainst. In the assembly, any desirable procedure may be followed. Either the inner brazing rings 31 may be first inserted between the inner rims 29 and the later stitch welded together as indicated at 32, or the outer brazing rings 30 may be first inserted between the outer rims 27 and the latter then stitch welded together as indicated at 33, or the reverse order may be followed.

The bellows units are then mounted upon trays to be thermally treated in a hydrogen atmospherically controlled furnace to a temperature in the neighborhood of 2000° F. if the brazing rings 30 and 31 are copper, or to a temperature of 1350° F. to 1500° F., or thereabouts, if brazing rings 30 and 31 are silver solder, to form outer and inner peripheral joints 34 and 35. Oxygen is preferably excluded from the furnace to prevent any oxidation during the brazing operation. Plates 25 should be made of a metal that may be hardened by a temper drawing operation and of a melting point higher than the brazing temperature. The brazing temperature may be the melting point of the brazing material and the time of treatment will depend upon the mass and type of material to insure saturation and a homogeneous flow of the brazing material into the joints. The bellows are then moved into a hydrogen atmospherically controlled cooling chamber until the temperature is reduced to about 1000° F., or the temperature representing the solidification point of the brazing material. Thereafter, the bellows may be quenched in water of a temperature from 40° to 70° F., if it is desired to keep the bellows metal soft or partly soft, which I contemplate doing in order to adjust the size and concentricity of each flange 36. If the metal is beryllium copper and silver solder is used as a brazing material, the bellows is removed from the furnace and immediately quenched in water at 40° F. to 70° F. By subjecting the entire bellows to the brazing temperature and keeping the metal temporarily soft in this manner, I have found that the bellows can be thereafter furnished to customers at any length and the difficulty of not being able to select the number of flanges that will produce the exact dimensions desired by the customer is overcome. It is only necessary to extend or compress the flanges to meet this desired dimension, and the operation further admits of a novel adjustment to secure concentricity of the flanges, both of which adjustments are then made after all structural fabrication has been completed so that there will be no further possible change in shape or dimension. Before this invention, the problem of maintaining concentricity of the flanges during fabrication was exceedingly troublesome, and the methods of fabrication employed aggravated the occurrence of mis-shaping when handling during the joining of the sections at the peripheries and the forming of the sections.

The brazing treatment may also be accomplished by heating the bellows units with the broad flame of a gas and compressed air torch to the temperature producing a cherry red of the metal, or in the neighborhood of 1350° F. to 1500° F. The torch flame may be removed when the brazing material is observed to flow. Thereafter, a blast of air may be played upon the hot bellows unit until the cherry red color of the metal disappears and the metal assumes a dark color, which will be when the temperature is reduced to about 1000° F., or about the solidifying point of the brazing material. The bellows unit may again be immersed in a cold bath (40° F.– 70° F.) to keep the metal soft, if so desired. Any oxide coating may be removed by the use of a suitable bath, such as aqua rega or other material, and a tap water rinsing. If the bath of aqua rega would produce an unsuitable etching of the metal surfaces, a bath of an inert acid, such as any suitable combination of sulfuric and chromic acids with distilled water may be used instead. Before removing the oxide coating, any flux may be removed by boiling the bellows unit in aluminum neutralizing solution and rinsing it in hot water. After removing the oxide coating, another dipping in aluminum neutralizing solution and rinsing in hot water may take place and the bellows unit then stored in acetone until the next operation.

The thermal treatment to effect the brazing operation forming joints 34 and 35 may also novelly be carried out by a salt bath. The parts are assembled and then treated with any oil solvent, such as carbon tetrachloride and bright dipped in say aqua rega or the aforesaid inert acid bath, to remove any oxide coating on the surface of the parts. Then the units are immersed in a salt bath of a temperature say of 1350° F. to 1500° F. for several minutes and then quenched in a water bath of 40° F. to 70° F. Any remaining salt may be removed from the unit by dissolving in running tap water. Again, the parts may be cleaned in an aluminum neutralizing solution and rinsed in hot water to remove flux and then put in a bath in aqua rega, or said inert acid bath, and rinsed in tap water. End fittings may be attached in any suitable way at this time, if they are to be used, it being understood that they may be brazed by induction heating so as to confine such heating to a local area if the heat is not to spread through the bellows unit. The bellows unit may now be dipped in a neutralizing and cleansing agent such as Oakite or said aluminum neutralizing solution, then rinsed in clean water and dried. At this point, adjustments for length and concentricity, similar to those previously explained, may be made while the metal is still soft.

Another thermal treatment effecting the brazing operation of joints 34 and 35 may be by induction heating where the bellows unit may be placed upon a table which moves toward and away from induction coils designed to be wound to fit closely at the inside and outside diameter of the bellows. When the coils have been adjusted for perfect heat penetration, the circuit is closed until a temperature in the neighborhood of 1350° F. to 1500° F. is developed, or until there is perfect flow of the brazing material into the joints. The bellows may be quenched automatically upon the opening of the switch of the induction coil circuit by a blast of cold air against the bellows or by quenching in a bath of cold water, until the temperature is reduced to about 1000° F., or any point at which the brazing material solidifies. It is found that, as an alternative, quenching until the bellows metal changes to a dark color is suitable. The softness of the metal at this point may be preserved temporarily by immersing the bellows in a cold bath (40° F.–70° F.). Boiling in an aluminum neutralizing solution and dipping in hot water to remove any flux and cleaning in aqua rega or an inert acid to remove any oxide coating, which may then be followed by a rinse in clear tap water, may then take place. The end fittings, if any are to be attached, may be assembled and brazed by induction heating as described.

Resistance heating may also be used to apply the heat necessary to effect a brazing operation at the joints 34 and 35. The modus operandi is substantially the same as the induction heating except that the bellows unit, with or without the end fittings, are assembled and held between carbon electrodes. The bellows unit forms a part of the circuit and the heat developed by the current flow melts the brazing material to cause it freely to flow into the joints. Otherwise, the steps may be those used for induction heating.

After the bellows unit is thermally treated as above explained, to effect a brazing operation at the joints 34 and 35, and it is adjusted in its soft state as to length and concentricity of flanges, the method herein disclosed being the first I believe to provide or even admit of such adjustments in the fabrication of a sectional spring bellows, the unit is drawn to a desired spring temper to produce a predetermined spring rate by a further thermal treatment, but at temperatures lower than the temperatures used to braze and at temperatures not affecting the surface of the metal or impairing the structural characteristics.

As previously explained in connection with the structure shown in Figs. 1 to 5, inclusive, the unit illustrated in Figs. 6 to 10, inclusive, may be subjected to a temperature ranging from 400° F. to 1100° F. for a suitable period of time, which may be from thirty minutes to two hours, depending upon the hardness desired to produce a predetermined spring rate. The kind of metal, the thickness thereof, the width of the flexing portion of the plates, which is the distance between the outer and the inner peripheral joints 34 and 35, as well as the formation of this flexing portion, will determine the spring rate to be imparted to the bellows unit by this operation.

The form of joint shown in Figs. 11 to 14, inclusive, omits the stitch or seam welding disclosed in the previous forms and relies upon the brazed union to provide the necessary mechanical strength as well as the seal. Although the same configuration is shown for the plates 40, it will be understood that other designs may also be used. The flat portions 41 at the outer peripheries and the flat portions 42 at the inner peripheries act as outer and inner rims which cooperate with like rims of adjacent plates to receive brazing rings or ribbons 43 and 44 therebetween, the faces 45 and 46 of these rims being planar to permit the brazing material to be clamped therebetween and provide a substantial surface in contact therewith. The plates of the various flanges 47 thus formed are assembled with the brazing rings 43 and 44 therebetween as shown in Fig. 14 and are clamped together by a suitable fixture 48 so that pressure is exerted against the brazing rings. The assembled unit is then subjected to any of the foregoing thermal treatments for brazing. The pressure will cause the brazing rings 43 and 44 to be reduced in thickness, which is advantageous in a brazing operation, because I have found that within certain limits a small body of brazing material between surfaces 45 and 46 of the respective outer and inner joints will produce a more effective and stronger joint than if a larger quantity is permitted to remain. To illustrate, if the brazing rings are .003 inch thick, as shown in Fig. 12, when inserted between faces 45 of rims 41 and faces 46 of rims 42, the pressure that may be applied, say, by a fixture like 48, can reduce this thickness to .001 inch during the brazing operation, as shown in Fig. 13. The excess material will flow outwardly and form annular beads 49 and 50, which tend to strengthen the joints and increase the sealing effect.

Here again, if the brazing operation has set up local stresses at or about the joints as the result of the brazing operation and it is desirable to have a relatively strain-free structure at the time of drawing to produce a predetermined spring rate throughout the entire bellows unit, a stress-relieving anneal may form the next step in the method. If the brazing treatment has been conducted to subject the entire unit evenly to the brazing temperature and unequal strains are not present, a stress-relief anneal may not be necessary. If the metal is non-austenitic, heating the unit to the high critical temperature and quenching will impart uniform stressing which will be relieved in a subsequent thermal treatment effecting the desired spring temper.

Fig. 15 illustrates an exceptionally strong and novel type of brazed joint when used in a bellows structure which is thereafter subjected to a uniform thermal treatment to produce a uniform spring rate. The sectional diaphragms or plates 55 are novelly copper plated, or coated, with a thin deposit of copper, so that all that is required in the construction of the plates themselves are opposing flat surfaces like 56 and 57 at the outer peripheral joint 58 and surfaces 59 and 60 at the inner peripheral joint 61. When these opposing flat faces are clamped together, and subjected to a temperature that will melt copper, which may be in the range of 2050° F., these surfaces will be effectively brazed together by an extremely strong union because a minimum spacing will be provided with a minimum of brazing material forming the joint. In addition to electro plating or coating, the copper may be applied by spraying, either upon all of the diaphragms or the peripheral portions or only the opposing flat surfaces 56 and 57 of the outer joint 58 and the opposing flat surfaces 59 and 60 of the inner joint 61. The brazing may be by any one of the aforesaid described brazing methods, and a stress-relief anneal may also be used, if necessary, or a stress-equalizing treatment if non-austenitic metal is used, before subjecting the bellows unit to a spring tempering thermal treatment. This step may comprise a thermal treatment above the critical limit of the metal (usually steel in this instance), say between 1550° F. and 1600° F. for one to two hours, which may be the time required to heat saturate the metal, and then quenching in oil or water at room temperature. The spring tempering treatment may be that described in connection with the other forms of bellows units disclosed herein so that the ultimate product may be of a predetermined length, have concentric flanges, and of a predetermined calibrated spring rate uniformly imparted to the entire unit.

Figs. 16 and 17 illustrate another novel type of joint that may be used in a bellows structure which, when fabricated, may be subjected to a uniform thermal treatment to produce a uniform spring rate. The plates or diaphragms 65 are drawn to any desirable configuration and are furnished with inner and outer rims 66 and 67. These rims have flat inner surfaces 68 and 69, which will abut each other when plates 65 are assembled to form the various flanges of the finished bellows. The outer edges of rims 66 and 67 may then be subjected to an atomic hydrogen arc to effect a fusion of the metal to form the outer and inner welded joints 70 and 71. The arc may be directed so that the hydrogen streams protect the arc to prevent oxygen tending to oxidize the metal being fused. Inner joints 71 may be first made in this manner by mounting adjoining plates of adjacent flanges in proper fixtures to expose the edges of the abutting rims 66 to the atomic hydrogen arc. Thereafter these plates, which are thus welded together, are mounted upon a mandrel 72 or the like and rotated therewith so that the torch 73, as shown in Fig. 17, may direct its arc against the edges of the rims 66 to fuse the same. Metal need not be added to effect the weld, and hence, the welded joints 70 and 71 are formed only of the base metal of the plates. This will eliminate the tendency to corrode and will produce an exceptionally strong and permanent joint.

The assembled bellows unit may be thermally treated to effect a stress-relieving anneal, or to effect a uniform stressing in the case of a non-austenitic metal, if the welding temperature has been found to distort the metal adjacent the weld or cause internal stresses to form therein. The procedure to be followed may be that explained herein, so that, when subsequently treated to a temper drawing operation in the manner previously described, a uniform spring rate will be produced.

Figs. 18 to 22 illustrate metal bellows embodying the invention and employing a butt weld type of joint that provides a continuous wall substantially of uniform thickness and eliminating the usual increase of material at the joints caused by overlapping of the ends of the sections or added material to form the joints. The sections 75 are spun or drawn, as previously explained, out of soft or semi-soft metal, and have their inner and outer rims formed with lips 76 and 77, respectively. When the rims are placed together, these lips 76 and 77 will furnish material to form welded joints upon the application of a welding arc. I contemplate using any suitable welding equipment for this work, but find that an atomic hydrogen arc advantageously eliminates oxidizing of the material at the weld, which is particularly helpful in making a joint for a bellows which is adapted to have its walls repeatedly flex in use. Many uses require not only a strong joint but a seal that is capable of retaining a vacuum less than .001 of a micron.

Figure 20:
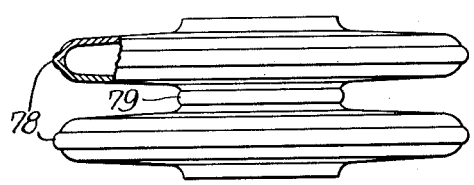
Fig. 20 illustrates in elevation these several flanges after they are welded together.

As illustrated, outer lips 76 will abut each other when plates 75 are put together, the same as inner lips 77. When the arc is applied, these lips 76 and 77 will fuse and form outer and inner welds 78 and 79, respectively, which, as shown in Fig. 20, may result in a slight building up of the material so as to prevent any tendency of the metal to flow inwardly of the wall and cause a slight inward recession of the material from the outer surface, as might be the case if lips 76 and 77 were omitted.

Figure 21:
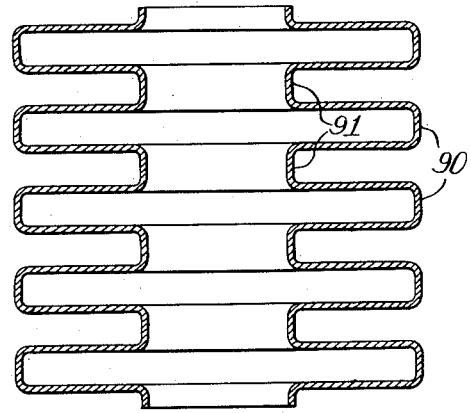
Fig. 21 illustrates a metal bellows embodying the invention, but showing another form of butt weld that may be employed.
Figure 19:
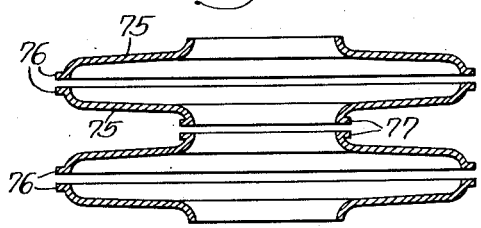
Fig. 19 illustrates in vertical section the sectional parts of several flanges before they are welded together.
Figure 22:
Fig. 22 illustrates the sectional parts of several of the flanges before welded together.

A final grinding operation will suitably reduce the material at 78 and 79 and produce finished outer and inner peripheral joints 80 and 81 substantially of the same thickness as the metal of plates 75. Substantially the same structure is shown in Figs. 21 and 22, the difference being in the shape of plates 85 which have vertical outer walls 86 and vertical inner walls 87 with lips 88 and 89, respectively. After the welding operation, the finished joints 90 and 91 will be formed by joining the vertical walls of adjacent plates 85 into a single wall of the same thickness throughout, after a suitable grinding operation at the weld, if these lips 88 and 89 are found to build up the material slightly.

Again the fabricated bellows units may be thermally treated to effect a stress-relieving anneal, or a uniform stressing in the case of non-austenitic metals, if the welding temperature has been found to distort the metal adjacent the weld or cause internal stresses to form therein. The procedure to be followed may be that previously explained, so that, when subsequently treated to a temper drawing operation in the manner likewise previously explained, a uniform spring rate will be produced. The structures shown in Figs. 18 and 22 are considered exceptionally novel when fabricated in accordance with the disclosure hereof because they permit the making of the sectional type of bellows out of spring metal into a substantially continuous wall which is in effect unbroken, may be of uniform thickness throughout, have a uniform spring rate imparted thereto, and be uniformly flexible without any tendency of rigidity by reinforcement at the joints caused by overlapping of material in other joints.

As a part of the method disclosed herein to produce bellows units by a form of fabrication imparting a calibrated spring rate thereto, the steps of checking for any error that might arise in the manufacture of units are included. To this end, a finished product may be furnished for installation in control devices without subjecting users to any risk of failure after placed in operation. Failures at this time have been known to cause disastrous results not only in loss of equipment, but of life. These steps may include mounting the finished product 93 upon a dead weight tester 94 shown in Fig. 23 for creating an internal pressure and for measuring the forward and return strokes at predetermined pressure increments. For example, apparatus 94 includes a base 95, a vertical standard 96 with horizontal extensions 97 and 98, and a vertical bearing sleeve 99. Vertical standard 96 is provided with a duct 100 communicating with ducts 101 and 102, the latter being in communication with a reservoir of oil 103. A weight platform 104 is carried by a shaft 105 movable vertically in sleeve 99. A sleeve 106 is fixed to the upper end of shaft 105 directly below weight platform 104. Duct 101 communicates with a duct 107 in a housing 108 into which the finished bellows 93 is threaded. Duct 100 is adapted to communicate with a duct 109 in a housing 110 having a plunger 111 operated by a handle 112. As handle 112 is rotated to advance plunger 111, the pressure of the oil in ducts 100 and 109 increases until it reaches a value equal to the weight of platform 104, and any additional weights as shown in dotted lines that may be carried thereby. When shaft 105 is raised to lift sleeve 106 from housing 99, as shown in Fig. 23 so that the weight platform 104 floats, the pressure of the oil is equal to the weight of platform 104 and the weight carried thereby. The oil enters the interior of the bellows 93 and pressure is exerted against the inner walls thereof. A standard 113 on base 113' carries a gauge 114 having a movable pin 115 which is adapted to abut against the movable end of bellows 93 and be moved by the bellows to indicate the stroke of the bellows when subjected to pressure in the manner described. In testing the device for travel per increment of pressure, say in units of 50, 100 and 150 pounds per square inch, the reading of gauge 114 may be charted as shown in Fig. 24. The weights of 50 pounds each, as shown in dotted lines, may be added during the readings taken of the up-stroke and may then be removed individually when readings on the down-stroke are taken. If the metal takes a set or hysteresis occurs so that the return stroke is not equal to the up-stroke, curve b will occur. If this set in the metal or hysteresis does not occur, the return stroke is the same as the up-stroke and the single curve a is produced each time. If the hysteresis is not more than .00035 inch for a given reading and does not again occur on the second down-stroke at these different increments of pressure, after allowance is made therefor on the second test, the bellows unit may be accepted. Otherwise it is rejected.

If so desired, a squirm and leak test may be given bellows unit 93 by the apparatus shown in Fig. 25. In this test, standard 113 and gauge 114 are removed and a standard 117 having horizontal spaced arms 118 and 119 is substituted so that the bellows base will rest upon arm 118. Thereafter, pressure may be imparted to the interior of bellows 93 until a given value is reached. The upper end of bellows 93 will bear against the upper horizontal arm 119 and the up-stroke will accordingly be restrained. If any of the flanges of bellows 93 should be displaced, this is known as squirm and the bellows will be rejected. Also, if any leak occurs while bellows 93 is subjected to the pressure, the unit will be likewise rejected.

The apparatus illustrated in Fig. 26 determines whether a predetermined or calibrated spring rate has been imparted to the finished bellows 93. A spring rate tester 120 includes a base 121, a weight table 122, a handle 124 adapted to be operatively connected to a shaft 125, and a head plate 126 carried by shaft 125. Weight table 122 is provided with an extension 127 adapted to have a pin 128 bear thereagainst, as shown, which pin is associated with a dial micrometer 129 carried by shaft 125 by a connection 130 shown in dotted lines in Fig. 26. As shaft 125 rises and lowers, dial micrometer 129 also rises and lowers and brings pin 128 to bear against weight table extension 127. Scale dial 131 is designed to indicate the pressure in pounds that is applied against the upper end of bellows 93 when handle 124 is actuated. The degree of compression or travel of bellows 93 in terms of inches, or any other suitable calibration, will be indicated by dial micrometer 129. For example, the calibrated spring rate for bellows 93 will be 25 pounds per inch of travel if scale dial 131 indicates a pressure of 25 pounds being applied against the bellows when dial micrometer 129 indicates a travel of one inch of bellows 93.

From the foregoing explanation it will be apparent that with the checking of hysteresis and squirm and leak, a finished bellows unit may have its spring rate measured so that any variation in the units of the same production lot will indicate failure of the operator properly to carry out the steps of the method herein disclosed for fabricating the same. Human error is therefore carefully checked in order to produce bellows units of precision manufacture having a definite calibrated spring rate.

A bellows unit embodying the above described invention overcomes many of the limitations of prior structures and may be characterized by (a) Extraordinary sizes and capacities;
(b) High temperature ranges in which they may be used;
(c) Increased tensile strength with elimination of creepage of metal under excessive loads and temperatures;
(d) Elimination of corrosion ordinarily produced by fluxes and brazing material;
(e) Ability to withstand pressures (10,000 pounds per square inch or more);
(f) Elimination of porosity in metal and joints;
(g) Increased traveling range and lateral deflection;
(h) Heavy duty service; and
(i) Practically no limit in flange dimension.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. The method of making a metal flanged bellows having an expansible and contractible wall of a predetermined spring rate which comprises forming a plurality of diaphragms of metal in a relatively soft or semi-soft or in an annealed state, welding said diaphragms at their peripheries without destroying said soft or semi-soft state of the metal, adjusting the flanges formed by the diaphragms for spacing and concentricity, and heat treating the fabricated unit to impart a predetermined spring rate to said wall.

2. The method of making a sectional bellows having an expansible and contractible wall of a uniform spring rate which comprises forming a plurality of diaphragms of spring metal, assembling said diaphragms, placing said assembled diaphragms in a heating zone of a temperature range of 1400° F. to 1550° F. until heat saturated to effect a union at the peripheries thereof, quenching said diaphragms in a cooling liquid, attaching end fittings by a temperature treatment affecting only said end fittings and the peripheral portion of the diaphragms to which they are attached, adjusting said diaphragms for space and concentricity, and thereafter heating the diaphragms and the attached end fittings to a temperature from 575° F. to 600° F. and slowly cooling according to the hardness and tensile strength desired.

3. The method of making a sectional metal bellows of a continuous homogeneous wall of equal thickness throughout which comprises forming a plurality of diaphragms of metal of uniform thickness with peripheral lips extending outwardly therefrom to prevent the flow of the metal inwardly upon fusing, assembling the diaphragms to bring said peripheral lips of adjacent diaphragms together, fusing the metal of said outwardly extending peripheral lips of adjacent diaphragms into a homogeneous mass, and finally removing the excess of the outwardly extending fused metal to make the vertical walls of the fused adjacent diaphragms into a single integral wall of uniform thickness.

WALTER C. HASSELHORN.

REFERENCES CITED

The following references are of record in the file of this patent:

UNITED STATES PATENTS

| Number | Name | Date |
|---|---|---|
| 1,248,830 | Dunham | Dec. 4, 1917 |
| 1,748,576 | Merriam | Feb. 25, 1930 |
| 1,836,634 | Urfer | Dec. 15, 1931 |
| 1,914,083 | Eaton | June 13, 1933 |
| 1,939,242 | Thaheld | Dec. 2, 1933 |
| 2,058,301 | Doran | Oct. 20, 1936 |
| 2,104,776 | Shaw | Jan. 11, 1938 |
| 2,117,106 | Sillman | May 10, 1938 |
| 2,117,219 | Shaw | May 10, 1938 |
| 2,148,457 | Grossarth | Feb. 28, 1939 |
| 2,296,435 | Giard | Sept. 22, 1942 |
| 2,322,924 | Daiger | June 29, 1943 |
| 2,323,985 | Fausek | July 13, 1943 |
| 2,347,185 | Fentress | Apr. 25, 1944 |
| 2,350,532 | Richardson | June 6, 1944 |
| 2,352,038 | Tolke | June 20, 1944 |